United States Patent [19]

Hanni et al.

[11] Patent Number: 4,550,222

[45] Date of Patent: Oct. 29, 1985

[54] PROCESS FOR INTERCEPTION-PROTECTED FREQUENCY BAND COMPRESSED TRANSMISSION OF SPEECH SIGNALS

[75] Inventors: Manfred Hanni, Puchheim; Josef Brusch, Unterhaching, both of Fed. Rep. of Germany

[73] Assignee: Siemens Aktiengesellschaft, Berlin & Munich, Fed. Rep. of Germany

[21] Appl. No.: 400,997

[22] Filed: Jul. 23, 1982

[30] Foreign Application Priority Data

Sep. 28, 1981 [DE] Fed. Rep. of Germany ....... 3138523

[51] Int. Cl.[4] .......................... H04K 1/00; H04L 9/00
[52] U.S. Cl. .......................... 179/1.5 R; 179/1.5 FS; 178/22.17
[58] Field of Search .......................... 178/22.04, 22.17; 179/1.5 R, 1.5 S, 1.5 M, 1.5 FS; 455/26-30

[56] References Cited

U.S. PATENT DOCUMENTS

| | | | |
|---|---|---|---|
| 3,204,034 | 8/1965 | Ballard et al. | 179/1.5 R |
| 3,773,977 | 11/1973 | Guanella | 178/22.04 |
| 3,921,151 | 11/1975 | Guanella | 178/22.04 |
| 3,944,745 | 3/1976 | Gawnett | 179/1.5 R |
| 4,011,408 | 3/1977 | Miller, III | 179/1.5 R |
| 4,020,285 | 4/1977 | Branscome et al. | 179/1.5 R |
| 4,052,565 | 10/1977 | Baxter et al. | 179/1.5 R |
| 4,149,035 | 4/1979 | Frutiger | 179/1.5 R |
| 4,159,399 | 6/1979 | Asakawa et al. | 179/1.5 R |
| 4,383,322 | 5/1983 | Halpern et al. | 179/1.5 R |

FOREIGN PATENT DOCUMENTS

| | | | |
|---|---|---|---|
| 1173948 | 7/1964 | Fed. Rep. of Germany . | |
| 2315542 | 3/1973 | Fed. Rep. of Germany | 178/22.17 |
| 55-23622 | 2/1980 | Japan | 178/22.17 |
| 56-94859 | 7/1981 | Japan | 178/22.17 |

OTHER PUBLICATIONS

S 7471 0137H, 27th Annual Conf. IEEE Vehicular Tech. Group, Orlando, Fla., (3/77), pp. 8–11, Bailey "Digitally Encoded Voice Encryption Sytem".

Guanella, G., "Verfahren Zur Automatischen Sprachverschleierung", Brown Boveri; Miheilungen, Dec. 1941, pp. 397–408.

Primary Examiner—Salvatore Cangialosi
Attorney, Agent, or Firm—Hill, Van Santen, Steadman & Simpson

[57] ABSTRACT

In order to achieve a good masking, together with minimum bandwidth requirement of sample values of spectral channels which are to be transmitted in the timing of consecutive analysis intervals in a time division multiplex sum signal, and of other predetermined speech parameters which likewise represent sample values, including at least one item of synchronizing information, at the transmitting end, the time-wise overlap of the sample values and of the synchronizing information are effected pseudo-randomly within consecutive frames of the sum signal and the analog sum signal obtained in this manner is transmitted across a shaping network to the receiving end, either directly in its base frequeny, or in a desired higher frequency position, or else indirectly by modulation onto a carrier.

10 Claims, 5 Drawing Figures

PROCESS FOR INTERCEPTION-PROTECTED FREQUENCY BAND COMPRESSED TRANSMISSION OF SPEECH SIGNALS

BACKGROUND OF THE INVENTION

1. Field of the Invention

The present invention relates to a process for interception-protected frequency band compressed transmission of speech signals in accordance with the channel vocoder principle, wherein, at the transmitting end, in an analysis component, sample values indicating the mean spectral power and sample values representing other specific speech parameters are obtained in each analysis interval via rectifiers from the signal energy which is split into a plurality of spectral channel, which sample values are transmitted to the receiving end, together with at least one item of synchronizing information in the form of a time-division multiplex (TDM) frame (sum signal), and wherein, at the receiving end, the individual sample values of the TDM subsignal are distributed frame-by-frame amongst associated spectral channels and amongst associated inputs for the specific speech parameters and the synchronizing information of a synthesis component which synthetically generates the original speech signal therefrom.

2. Description of the Prior Art

Processes of the type set forth above are known, for example through the German published application No. 11 73 948 and are used wherever a transmission channel of adequate bandwidth is unavailable for conventional speech transmission. When the channel vocoder principle is used, it is possible to transmit a speech signal across channels whose transmission bandwidth is only 1,000 Hz and less. As only the envelope curve values of the spectral channels and other specific speech parameters, such as the fundamental speech frequency and the picture signal are transmitted in the case of the channel vocoder, a transmission channel of this kind exhibits good resistance to interception simply for this reason.

If higher requirements are placed on the transmission of speech with regard to its resistance to interception, the normal practice is to convert a speech signal of this type into a coded speech signal and to encode the coded signal by the use of a modulo-2 addition with a code sequence. Here again, the use of the channel vocoder principle offers considerable advantages with regard to the least possible bandwidth requirement. In place of the 64 kbit normally required in this case, it is possible to transmit a digital channel vocoder signal in encoded form even at 2.4 kbit/sec. For this purpose, the sample values of the spectral channels, which have been determined in the analysis component, and sample values representing other predetermined speech parameters are coded prior to their composition to form a TDM sum signal, and the TDM digital sum signal is subsequently encoded in the conventional manner using a modulo-2 addition with a code sequence.

As indicated by practice, the transmission of digital, and possibly encoded channel vocoder signals, by shortwave radio gives rise to considerable difficulties due to multiple path propagation and due to selective fading. In the case of radio frequency signals in which the speech signal, in analog form, is modulated onto a carrier with amplitude or frequency modulation, the disturbing influence of multiple path propagation and of selective fading generally only leads to signal distortions which can be largely eliminated, for example, by emphasizing the transmitted level. On the other hand, in the case of digital radio signals, for example, transit time differences which arise with multiple path propagation in the order of one bit are in themselves sufficient to lead to a complete breakdown of the transmission length. Neither can the interference be counteracted in this case by emphasizing the transmission level. Moreover, the disturbing effect of multiple path propagation is the greater, the higher the selected bit rate within a channel. However, due to the digitization of the speech signal, when the channel vocoder principle is used, the bit rate cannot be substantially reduced below 2.4 kbit/sec. When four-phase modulation is used, for example, a bandwidth of approximately 3 kHz is needed.

SUMMARY OF THE INVENTION

The object of the present invention, therefore, in the context of a transmission process of the type initially mentioned, is to provide a further realization which, while employing the channel vocoder principle, even when the resistance to interception is subject to high requirements, has a frequency band requirement which lies substantially below a bandwidth of 3 kHz.

The above object is realized in a process for interception-protected frequency band compressed transmission of speech signals by the channel vocoder principle, according to the invention, in that at the transmitting end the time internesting of sample values and of the synchronization information takes place pseudo-randomly within consecutive frame in the sum signal and the analog sum signal obtained in this manner is transmitted across a shaping network to the receiving end, either directly in a space frequency or a desired higher frequency position, or else indirectly modulated onto a carrier.

The invention is based on the fundamental recognition that the resistance to interception of a channel vocoder speech signal can be considerably improved, even while dispensing with encoding in a digital plane, in that the time location of the sample values of the spectral channels and of other predetermined speech parameters, including the synchronizing information, is changed pseudo-randomly from frame-to-frame. The analog sum signal obtained in this manner exhibits a high degree of speech camouflage which can be additionally improved by taking further measures.

A first preferred measure consists in that, apart from the fundamental speech frequency and the pitch signal, the volume of the speech signal which is to be transmitted and which is regulated to a constant sum level at the transmitting end, represents one of the specific speech parameters. This ensures that the dynamics of the speech cannot be detected in the camouflaged signal which is to be transmitted, but can be regained at the receiving end.

In a second preferred measure, at the transmitting end the number of the sample values of the spectral channels and of the other specific speech parameters of an analysis interval is enlarged by scan values which represent additional blank values and which can be derived, for example, from a noise source. These sample values which represent blank values result in additional adulteration of the camouflaged speech signal which can easily be suppressed at the receiving end.

A third preferred measure which is to be combined with the described second preferred measure provides that the number of sample values which represent blank values and, therefore, the length of one frame of the sum signal, should be changed pseudo-randomly from frame-to-frame in the order of a maximum of 10 percent. A desired pseudo-random fluctuation in frame length in this case results in no information gaps in the time flow of the sum signal, since the length of each frame is always that necessitated by the number of consecutive sample values, including the synchronizing information.

In order to be able to dispense with the additional transmission of a further specific speech parameter in the form of a d.c. component, in a further development of the invention it is proposed that, in order to obtain an analog sum signal which is free of a d.c. component, at the receiving end by means of a shaping network each sample value of the sample values which follow one another within one frame of the sum signal is inverted. At the receiving end, this inversion is canceled prior to the disintegration of the sum signal into its former sample values.

Assuming that on the average every 20 msec, i.e. in a timing of 50 Hz, a frequency of sample values representing one analysis interval is transmitted, when for example there are 14 spectral channels the bandwidth amounts to approximately 1 kHz. This bandwidth, which is reduced approximately by a factor of 3 in comparison to a digital channel vocoder speech signal, offers the possibility of using a channel, available for transmission, having a bandwidth of 3.1 kHz (in accordance with CCITT standards) to carry out two-wire duplex operation in that, with the assistance of a filter switch and a converter, the available bandwidth of the transmission channel is split into two halves in order to transmit one sum signal in the one direction in its lower frequency band half and one sum signal in the other direction in its upper frequency band half.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
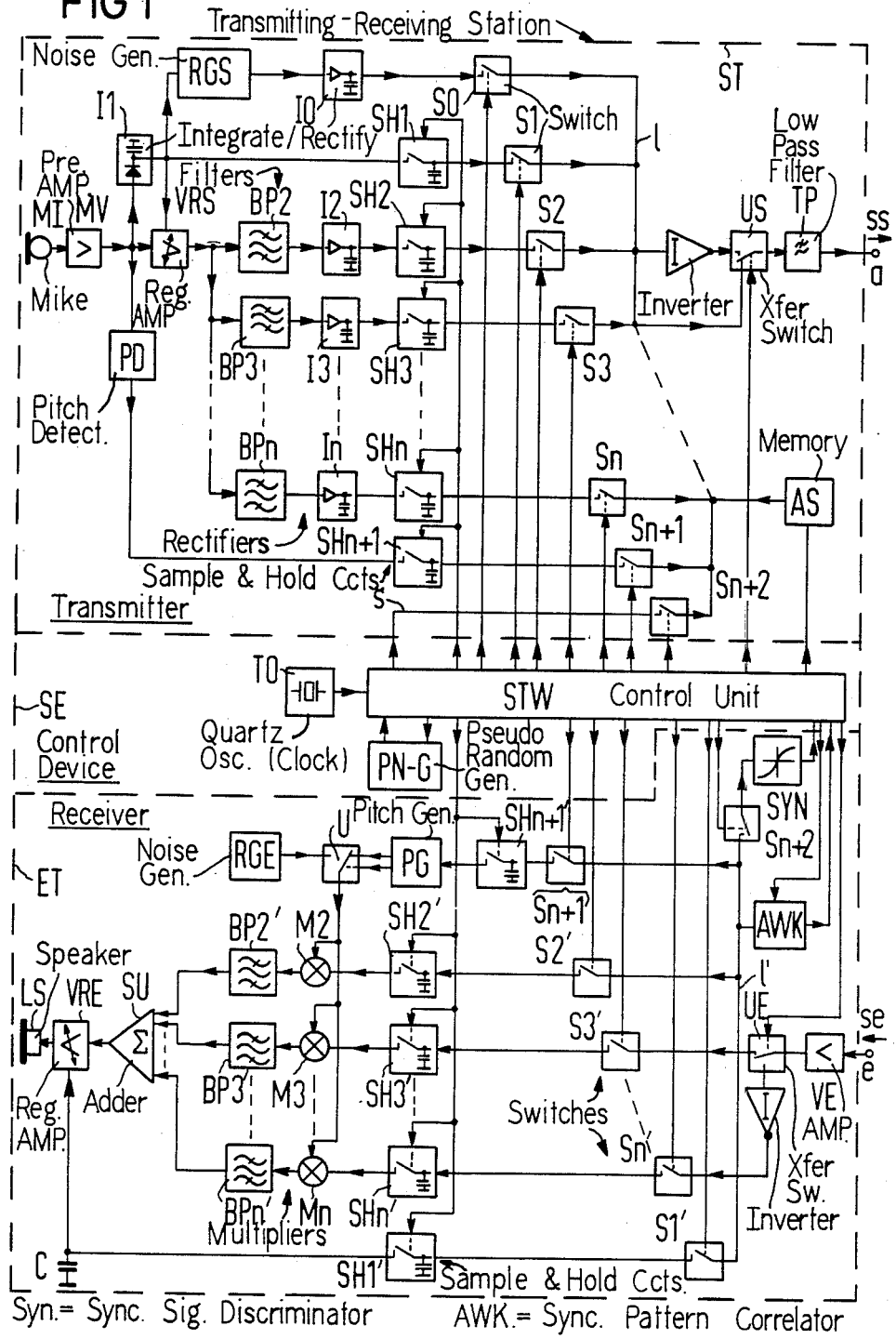
FIG. 1 is a schematic block diagram of a transmitting-receiving station which employs the process of the present invention.

A transmitting-receiving station is illustrated in FIG. 1 as comprising a transmitter ST, a receiver ET and a control device SE which is common to the transmitting and receiving ends. The transmitting-receiving station illustrated in FIG. 1 is designed for two-way speech operation. At its input, the transmitter ST comprises a microphone MI whose output signal is amplified in a microphone preliminary amplifier MV and is subsequently fed to a transmitting end regulating amplifier VRS. At the same time, the output signal from the microphone preliminary amplifier MV is fed to a rectifier arrangement I1 which has integration properties and to a pitch detector PD which generates a pitch signal. With the aid of the output signal from the rectifier arrangement I1, the level of the speech signal at the output of the transmitting and regulating amplifier VRS is set at a constant value. The output of the transmitting and regulating amplifier VRS is connected to a filter bank which forms the spectral channels and which comprises a plurality of band pass filters BP2, BP3 . . . BPn. The band pass filters are followed by a corresponding plurality of rectifier arrangements I2, I3 . . . In which also possess integration properties, and whose outputs are, in turn, connected to a corresponding plurality of sample and hold circuits SH2, SH3 . . . SHn. Identical sample and hold circuits SH1 and SHn+1 are provided for sampling the volume criterion at the output of the rectifier arrangement I1 and the output signal of the pitch detector PD, respectively. The signal which is present at the output of the rectifier arrangement I1, and which indicates the volume, is also fed to a control input of the transmitting and noise generator RGS whose output signal is fed to an output line 1 via a rectifier arrangement I0 which possesses integrating properties and via a controllable switch S0. The outputs of all of the sample and hold circuits are connected in common to the output line 1 via respective controllable switches S1 . . . Sn and Sn+1. An additional controllable switch Sn+2 connects a line s to the output line 1 for applying synchronizing information thereto.

Depending upon the position of a transmitting and transfer switch US, the output line 1 is connected, either directly, or indirectly via an inverter I, to the input of a low pass filter TP which has an output a for emitting the transmitting and sum signal ss. In addition, the transmitter ST comprises a memory AS which contains a start synchronizing signal and from which a synchronizing pattern is emitted to the common output line 1 at the beginning of a transmission process.

The common control device SE comprises a control unit STW, a quartz crystal-stabilized clock pulse oscillator TO and a pseudo-random generator PN-G. The control unit STW supplies all the clock pulses for the control of the sample and hold circuits SH0, SH1 . . . SHn and SHn+1 and all of the clock pulses for controlling the switches S0, S1 . . . Sn, Sn+1 and Sn+2. Furthermore, the control unit STW supplies the control clock pulses for the transmitting and transfer switch US and the memory AS for the emission of the synchronizing pattern.

Whereas the sample and hold circuits are controlled simultaneously in the turnover of the consecutive analysis intervals, for example every 20 msec, the switches S1, S2 . . . Sn, Sn+1 and Sn+2 which follow the sample and hold circuits are each actuated once within an analysis interval and the sequence in which they are actuated is pseudo-random in dependence upon the pulse pattern generated by the pseudo-random generator PN-G. In the same manner as the other switches S1, S2 . . . Sn, Sn+1 and Sn+2, the switch S0 assigned to the noise signal of the transmitting and noise generator RGS is actuated with a pseudo-random time position within an analysis interval, although here there can be more than one actuation within a single analysis interval. The number of noise sample values fed to the common output line 1 via the switch S0 in each analysis interval is dependent upon the bandwidth which is available to the sub-signal. As has already been mentioned above, these noise sample values which are transmitted within a frame of the sum signal increase the degree of camouflage of the sum signal. The transmitting end transfer switch US, the preceding inverter I, and the following low pass filter TP together represent a shaping network for the transmitting and sum signal ss emitted from the output a. In association with the inverter I, the transmitting and transfer switch US has the function of inverting each second one of the sample values which are present at the outputs of the switches S0, S1 . . . Sn, Sn+1 and Sn+2 and which follow one another within a frame and in this manner obtaining an a.c. voltage signal which is free of a d.c. component. The low pass filter itself suppresses undesired harmonics.

At an input e the receiver ET receives the receiving end sum signal se which is amplified in a receiving amplifier VE and fed, via a receiving end transfer switch UE, in dependence upon the position of its switching arm, either across the inverter I or else directly to a common input line l' for a plurality of switches S1', S2' . . . Sn', Sn+1', Sn+2'. By means of the receiving end transfer switch UE in association with the inverter I, the transmitting end inversion of each second sample value of the successive sample values within a frame is canceled. In accordance with the transmitting components the switches S1', S2' . . . Sn' and Sn+1' which are connected to the common input line l' are connected at the input end to the inputs of respective sample and hold circuits SH1', SH2' . . . SHn' and SHn+1'. The switch Sn+1' is connected to a synchronous signal discriminator SYN which is connected at its output to a control input of the control unit STW.

At the output end, the sample and hold circuits SH2', SH3' . . . SHn' of the spectral channels are connected to inputs of respective multipliers M2, M3 . . . Mn and have a second input which is connected, depending upon the nature of the transmitted voiced-unvoiced (pitch) criterion which is fed to a control input of a pitch generator PG, and actuates either the output signal of the pitch generator PG or the output signal of a receiving end noise generator RGE. The sample values of the spectral channels which are weighted in this manner are then fed via band pass filters BP2', BP3' . . . BPn' to an adder SU which, via a receiving and regulating amplifier VRE, emits from its output the synthetically-generated speech to a loud speaker LS. The transmitted sample value which contains the volume information is fed across a sample and hold circuit SH1' and via a capacitor C, which generates a time constant, to the control input of the receiving end regulating amplifier VRE.

The components of the receiver ET also comprise a synchronizing pattern correlator AWK which is connected at its input to the common input line l' and at its output to the control unit STW. It is activated at the beginning of a transmission process by a further control line which leads from the control unit STW to the synchronizing pattern correlator AWK. The control clock pulses for the switches and the sample and hold circuits are again supplied by the control unit STW which actuates each of the switches S1', S2' . . . Sn', Sn+1' and Sn+2' once in the timing of one frame of the receiving end sum signal se and, in fact, in such a manner that the sample values assigned to the spectral channels, to the pitch generator PG, to the receiving end regulating amplifier VRE, and to the synchronous signal discriminator SYN, occur at the associated inputs thereof.

Figure 2:
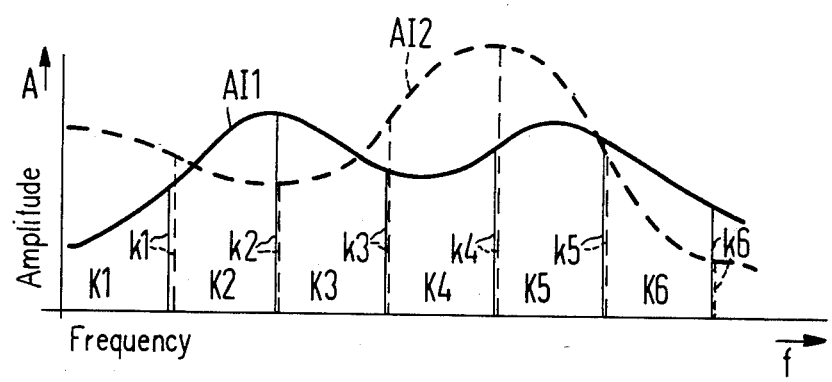
FIGS. 2 and 3 are graphic representations illustrating in detail the operation of the transmitting-receiving station of FIG. 1.

For a further explanation of the mode of operation of the transmitting-receiving device illustrated in FIG. 1, a diagrammatic representation is provided in FIG. 2 to illustrate, plotted with respect to the frequency f, the amplitude curve A for a channel vocoder signal composed of six spectral channels k1, k2 . . . k6 in respect of two consecutive analysis intervals AI1 and AI2. The sample values k1, k2 . . . k6 which indicate the mean spectral power and which are tapped from the output of the rectifier arrangements at the instant of actuation of the sample and hold circuits are indicated in the same manner. By way of improved differentiation, FIG. 2 represents the spectral amplitude curve of the analysis interval AI2 which follows the analysis interval AI1 including the sample values in a broken line.

Figure 3:
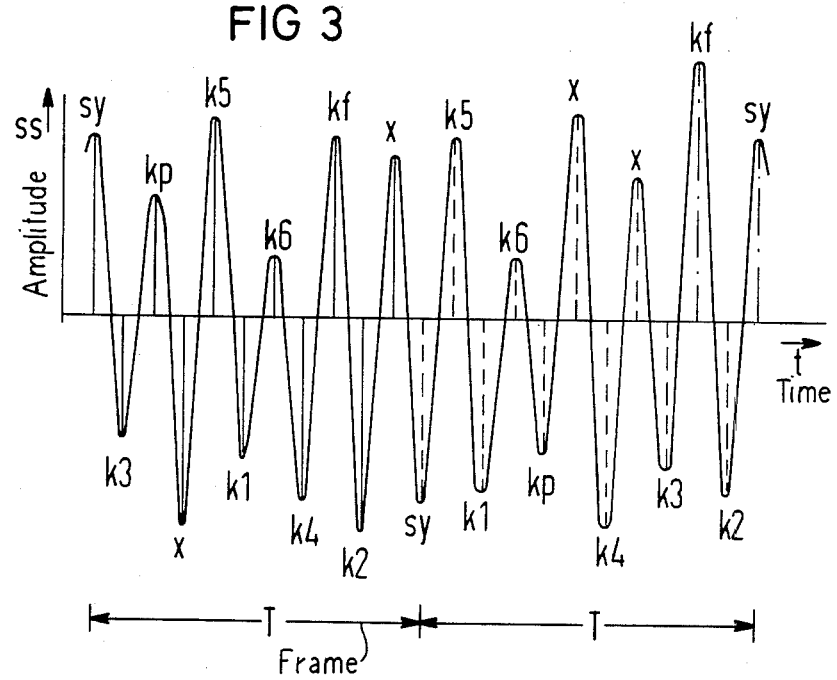

Plotted over time, the diagram of FIG. 3 represents the amplitude curve of the transmitting end sum signal ss across the two analysis intervals AI1 and AI2 corresponding to FIG. 2 at the output a of FIG. 1. The length of the frame T, which is governed by an analysis interval, is likewise represented in FIG. 3. As can be seen from FIG. 3, not only are the sample value k1, k2 . . . k6 and the noise sample value x arranged quasi-randomly in their time slots within a frame T, but are also alternately inserted within the pseudo-randomly predetermined sequence, whereby a d.c. value which is undesired as regards the transmission is eliminated. The item of synchronizing information sy which likewise represents a sample value, but here of constant amplitude, and which changes its sign from frame-to-frame, is arranged at the start of a frame in FIG. 3 only in order to clarify the recognition of the frames T. In practice, however, this item of synchronizing information is displaced pseudo-randomly in its time slot in the course of the consecutive frames in the same manner as the other sample values. Its function to maintain the synchronization of the receiving end in the timing of the consecutive frames of the receiving end sum signal se is not hereby impaired, since the position of an item of synchronizing information is predetermined by the pseudo-random sequence of the super-random generator PN-G.

Figure 4:
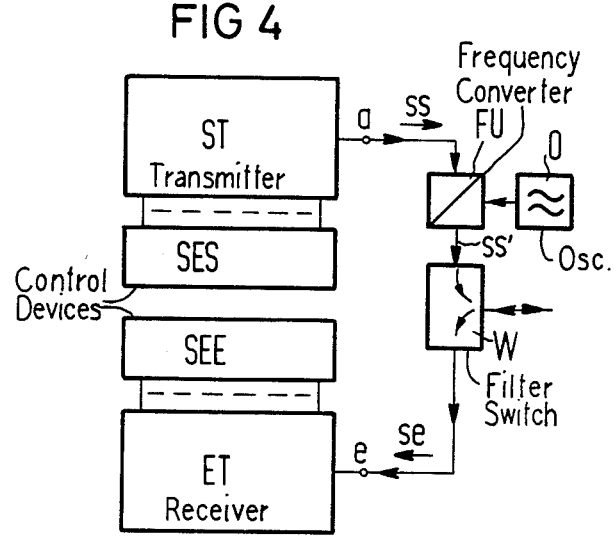
FIG. 4 is a schematic block diagram illustrating an embodiment of a transmitting-receiving station for the implementation of a two-wire duplex operation.
Figure 5:
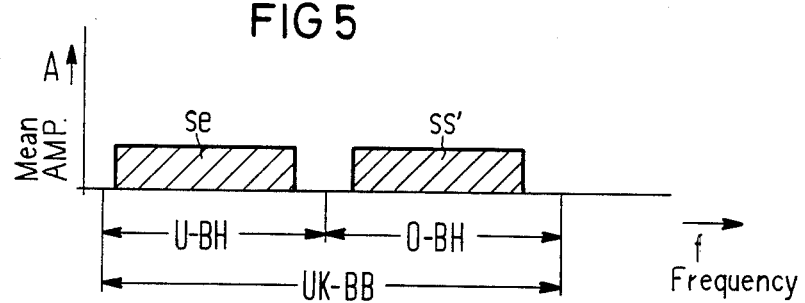
FIG. 5 is a diagrammatic illustration explaining in detail the mode of operation of the transmitting-receiving station illustrated in FIG. 4.

The examplary embodiment of FIG. 4 illustrates a transmitting-receiving station which facilitates two-wire duplex operation. The transmitter ST and the receiver ET correspond to the similar components of the transmitting-receiving station illustrated in FIG. 1. However, in place of a control device which is common to the transmitting and receiving components, here a control device SES and a control device SEE are assigned to the transmitter ST and to the receiver ET, respectively. The different frequency channels for the two directions of transmission, which are required for this purpose, are formed in that, at the output a the transmitting and sum signal ss is fed to a frequency converter FU having a converter oscillator 0 and shifted in its frequency into a higher range. Then, the transmitting end sum signal ss' which has been frequency shifted in this manner is fed via a filter switch W to the transmission link which is common to the two directions of transmission. The incoming receiving end sum signal se is fed in the original base frequency position across the filter switch W to the input e of the receiver ET. At the opposite station, in contrast to the station illustrated in FIG. 4, the converter SU, together with the converter oscillator 0, is looped into the receiving arm. For completeness, the diagram in FIG. 5 plots, over the frequency, the mean amplitude A of the spectrum of the transmitting and frequency-shifted sum signal ss' in the upper band half 0-BH and of the receiving end sum signal se in the lower band half U-BH of the available frequency band UK-BB of the transmission channel for a two-wire complex operation to be carried out by a transmitting-receiving station as is illustrated in FIG. 4.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a process for interception-resistant transmission of speech signals, in which speech signals are sampled, in a time overlapping manner, to obtain, in each of a plurality of analysis intervals, sample values of mean spectral power and predetermined speech parameters over a plurality of spectral channels, the sample values and at least one item of synchronizing information for each analysis interval are combined into a sum signal, the sum signals are transmitted in respective time-division multiplex frames, the sum signals are received and distributed, frame-by-frame, and the original speech signals are synthetically generated from the distributed sample values, the improvement therein comprising the steps of:
    transmitting the sample values and the synchronizing information pseudo-randomly internested within consecutive frames in the sum signal; and
    shaping the sum signal with a shaping network for transmission.

2. The improved process of claim 1, and further comprising the step of:
    transmitting the shaped sum signal in its own base frequency position.

3. The improved process of claim 1, and further comprising the step of:
    transmitting the shaped sum signal in a predetermined higher frequency position.

4. The improved process of claim 1, and further comprising the step of:
    transmitting the shaped sum signal by modulating the same onto a carrier.

5. The improved process of claim 1, and further comprising the step of:
    regulating the volume of the speech signal to a constant sum level as one of the predetermined speech parameters.

6. The improved process of claim 1, and further comprising the steps of:
    generating random noise; and
    sampling and inserting random noise into an analysis interval to represent blank values.

7. The improved process of claim 6, wherein the step of inserting random noise samples is further defined as:
    pseudo-randomly changing the number of random noise samples from frame-to-frame.

8. The improved process of claim 7, wherein the step of pseudo-randomly changing the number of random noise samples is further defined as:
    changing the number from frame-to-frame in the order of a maximum of 10%.

9. The improved process of claim 1, and further comprising the steps of:
    inverting each second sample value of the consecutive sample values within a frame prior to transmission; and
    canceling the inversion in the received signals prior to distribution for synthesis.

10. The improved process of claim 1, for two-wire duplex operation, comprising the steps of:
    splitting the available bandwidth into two halves for the transmission of one sum signal in one direction and another sum signal in the opposite direction.

* * * * *